United States Patent Office 3,677,777
Patented July 18, 1972

3,677,777
ANTIFOULING PAINT
Keiichiro Ishii and Michio Ueyama, Tokyo, Koshin Miyazaki, Takaoka-shi, and Tetsuo Noto, Takarazuka-shi, Japan, assignors to Nippon Soda Co., Ltd., Tokyo, Japan
No Drawing. Filed Aug. 26, 1968, Ser. No. 755,421
Claims priority, application Japan, Aug. 29, 1967, 42/54,961
Int. Cl. C09d 5/14
U.S. Cl. 106—15 AF                     4 Claims

ABSTRACT OF THE DISCLOSURE

The present invention relates to antifouling paints containing 2 - (N,N-dimethylthiocarbamoylthio) - 5-nitrothiazol and/or 2-(N,N-diethylthiocarbamoylthio)-5-nitrothiazol as antifouling agent.

---

The detailed explanation of the invention:

The present invention relates to antifouling paints and more particularly to marine antifouling paints having exceptional antifouling activity, longevity and no mammalian toxicity.

Marine fouling organisms attaching on a ship bottom surface corrode the ship hull and slow the ship speed. In order to protect such surface, antifouling paints containing compounds to be poisonous to the organisms, such as algae, coelenterates, tunicates, acorn shells and the like have been developed. Most common compounds as the antifouling agent are copper compounds, particularly cuprous compounds.

However, marine paints containing copper compounds as the antifouling agent require relatively large amounts of the copper compound to provide satisfactory lasting protection to the surface. Further, the marine paints are not satisfactory because of galvanic corrosion between materials and because of degradation of antifouling activity by reaction between the copper compounds and hydrogen sulfide, which is produced by reduction of bacteria from sulfate and organic matter in dirty sea water in ports.

Many antifouling paints containing organic poisons, such as compounds of arsenic, tin and the like, as the antifouling components have been studied in order to overcome said difficulties. But these paints are difficult to apply, since the organic poisons are irritative to skin or mucous membrane and have unpleasant odors. When organic poisons have no mammalian toxicity, the paints containing the organic poisons have neither satisfactory antifouling activity nor effective antifouling properties over a prolonged period of time.

Therefore, it is an object of the present invention to provide a marine antifouling paint which is highly effective in protecting ship bottom surfaces from marine fouling organisms.

A further object of the invention is to provide a marine antifouling paint which is active against marine fouling organism for a prolonged period of time.

Another object of the invention is to provide a highly effective novel organic marine antifouling agent having no mammalian toxicity.

Still another object of the present invention is to provide a highly effective composite marine antifouling agent.

The marine antifouling paints of the present invention comprise 2 - (N,N-dimethylthiocarbamoylthio)-5-nitrothiazol and/or 2-(N,N-diethylthiocarbamoylthio)-5-nitrothiazol as an antifouling agent, pigments and base vehicles.

2-(N,N-dimethyl or diethyl thiocarbamoylthio)-5-nitrothiazol is a compound having the general formula

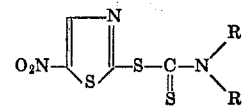

wherein R represents methyl or ethyl.

Generally, the compound is prepared by reacting 2-mercapto-5-nitrothiazol with N,N-dimethyl- or N,N-diethyl-thiocarbamoyl chloride of equivalent quantity.

The reaction is carried out in an organic solvent such as acetone at a temperature of about 50° C. to about 100° C. in the presence of a dehydrochlorinating agent such as a tertiary amine.

Then, the organic solvent is evaporated off under vacuum from the reaction mixture.

The reaction mass is then washed with water and recrystallized with ethyl alcohol.

The resulting product, namely, 2-(N,N-dimethyl thiocarbamoylthio)-5-nitrothiazol are yellow crystals having melting point of 146–147° C. and 2-(N,N-diethyl thiocarbamoylthio)-5-nitrothiazol are yellow crystals having melting point of 88–89.5° C.

Mammalian toxicity of the compounds is very small. For example, oral toxicity of 2-(N,N-dimethylthiocarbamoylthio)-5-nitrothiazol for a mouse is 3,000 mg./kg. and those of 2-(N,N-diethylthiocarbamoylthio)-5-nitrothiazol is 2,000 mg./kg.

Furthermore, the compounds are not irritative to neither skin nor mucous membrane.

Therefore, coating with a paint containing the compound is safe.

The compounds are inert to pigments, base vehicles and solvent, but compounded easily with various organic base vehicles because of affinity to oil.

Water solubility of the compounds is very small.

Accordingly, the paints containing the compounds have stable antifouling activity for a prolonged period of time in sea water.

Generally, 2-(N,N-dimethyl or diethyl thiocarbamoylthio)-5-nitrothiazol is present in the marine antifouling paint in an amount of about 2% to about 20% by weight based on the weight of the paint.

The pigments of the marine antifouling paints of the invention are generally the usually coloring pigments such as titanium dioxide, red iron oxide, red lead, litharge and the like, and contain extenders such as magnesium silicate. These pigments are utilized in conventional amounts.

The base vehicles of the antifouling paints of the invention are resinous binding agent such as rosin, modified rosin, naphthenic acid, oleoresinous varnish, polyvinyl resins, chlorinated synthetic rubber, butyl rubber and the like.

Generally, two or more of these vehicles are used in combination.

The base vehicle in the antifouling paint forms a film which is stable in sea water, yet capable of releasing the antifouling agent at a controlled rate, i.e., a rate sufficient to prevent the settling of fouling organism thereon.

In addition to the antifouling agent, pigment and base vehicle, the novel antifouling paints of this invention can also contain a solvent, plasticizers or other conventional ingredients.

For instance, as a solvent, mineral spirits, conventional paint thinners, toluenes or xylene is used. Plasticizers may be added to the base vehicles.

In the antifouling paint of the invention, a varnish comprising base vehicles, plasticizers and solvents may be used.

As is obvious to those skilled in the art, the amount of such ingredients in the antifouling paint may vary over wide limits, depending on the particular base vehicle chosen and the surface to which the antifouling paint is applied.

The marine antifouling paint of the invention is illustrated by examples presented below which are exemplary only and do not constitute limitations of the compositions of the invention.

of submersion, and fouling by marine fouling organisms was recorded.

In this test, ratings were given on a basis of 0 to 100%. A score indicates the percentage of the test panels surface covered by fouling organisms. A score of 0% indicates the absence of fouling organisms.

A rating of 100% means that the panel is completely covered by fouling organisms.

Table I compares the paints of the invention with the comparative paints and the control paint.

TABLE I

| Example No. | Antifouling agent in the paint | | Percent of fouling after— | |
|---|---|---|---|---|
| | Name | Amount (wt. percent) | 100 days | 150 days |
| 1 | 2-(N,N-dimethylthiocarbomylthio)-5-nitrothiazol. | 10 | 0 | 0 |
| 2 | 2-(N,N-diethylthiocarbamoythio)-5-nitrothiazol. | 10 | 0 | 5 |
| 3 | {2-(N,N-dimethylthiocarbamoylthio)-5-nitrothiazol. / Tetramethylthiuram disulfide | 10 / 10 | 0 | 0 |
| 4 | do | 10 | 10 | 15 |
| 5 | Cuprous oxide | 10 | 15 | 20 |
| 6 (control) | | | 100 | 100 |

EXAMPLE 1

Parts by weight
2-(N,N-dimethyl thiocarbamoylthio)5-nitrothiazol __ 10
Pigment _____ 30
Rosin and chlorinated rubber varnish _____ 60

These ingredients were compounded in the mixer until a homogeneous antifouling paint was produced.

EXAMPLE 2

Parts by weight
2-(N,N-diethyl thiocarbamoylthio)5-nitrothiazol ___ 10
Pigment _____ 30
Rosin and chlorinated rubber varnish _____ 60

These ingredients were compounded in a manner similar to that described above Example 1.

EXAMPLE 3

Parts by weight
2-(N,N-dimethyl thiocarbamoylthio)-5-nitrothiazol __ 10
Tetramethylthiuram disulfide (antifouling agent) ____ 10
Pigment _____ 30
Rosin and chlorinated rubber varnish _____ 50

These ingredients were compounded in a manner similar to that described above Example 1.

Several paints were compounded in a manner similar to that described above Example 1. Comparative paint containing 10 parts by weight of tetramethylthiouram or cuprous oxide as common antifouling agent in place of 2-(N,N-dimethyl thiocarbamoylthio)-5-nitrothiazol in the above Example 1 was prepared.

Further, one paint was prepared as a control, which paint was free from antifouling agent.

The paints of the invention (Examples 1–3), the comparative paints (Examples 4–5) and the control paint (Example 6) were separately brushed onto 3.4 inch by 4.4 inch test panels which were submerged for 150 days in the dirty sea at Osaka, Japan.

The test was performed in 5 ft. depth of the sea by a submersion test raft.

The panels were examined after 100 days and 150 days

It will be noted that paints 1 through 3 containing organic poison of the invention were markedly effective.

It will be appreciated that various modifications and changes may be made in the compositions of the invention by those skilled in the art without departing from the spirit of the invention in addition to those described above.

What we claim is:

1. A marine antifouling paint composition consisting essentially of an antifouling agent comprising 2-(N,N-dimethylthiocarbamoylthio) - 5 - nitrothiazol and/or 2-N,N-diethylthiocarbamoylthio)-5-nitrothiazol, and an organic resinous base vehicle, and said antifouling agent being present in amounts of about 2% to about 20% by weight based on the total composition.

2. The marine antifouling paint composition of claim 1 containing 2-(N,N-dimethylthiocarbamoylthio)-5-nitrothiazol as an antifouling agent, and said antifouling agent being present in amounts of 5% to 15% by weight based on the total composition.

3. The marine antifouling paint composition of claim 1 containing 2-(N,N-diethylthiocarbamoylthio)-5-nitrothiazol as an antifouling agent, and said antifouling agent being present in amounts of 5% to 15% by weight based on the total composition.

4. The marine antifouling paint composition of claim 1 containing a pigment, a plasticizer and a solvent, and in which said antifouling agent is present in amounts of 5% to 15% by weight based on the total composition.

References Cited

UNITED STATES PATENTS 3,236,793   2/1966   Robins et al. _____ 106—15 X
3,268,347   8/1966   Nagasawa _____ 106—15

FOREIGN PATENTS 20,133   10/1963   Japan _____ 260—302

LORENZO B. HAYES, Primary Examiner

U.S. Cl. X.R.
106—16; 424—270